April 19, 1927.
W. H. RICHARDS
1,625,428
FLUID METER AND MOTOR
Filed Aug. 31 1925
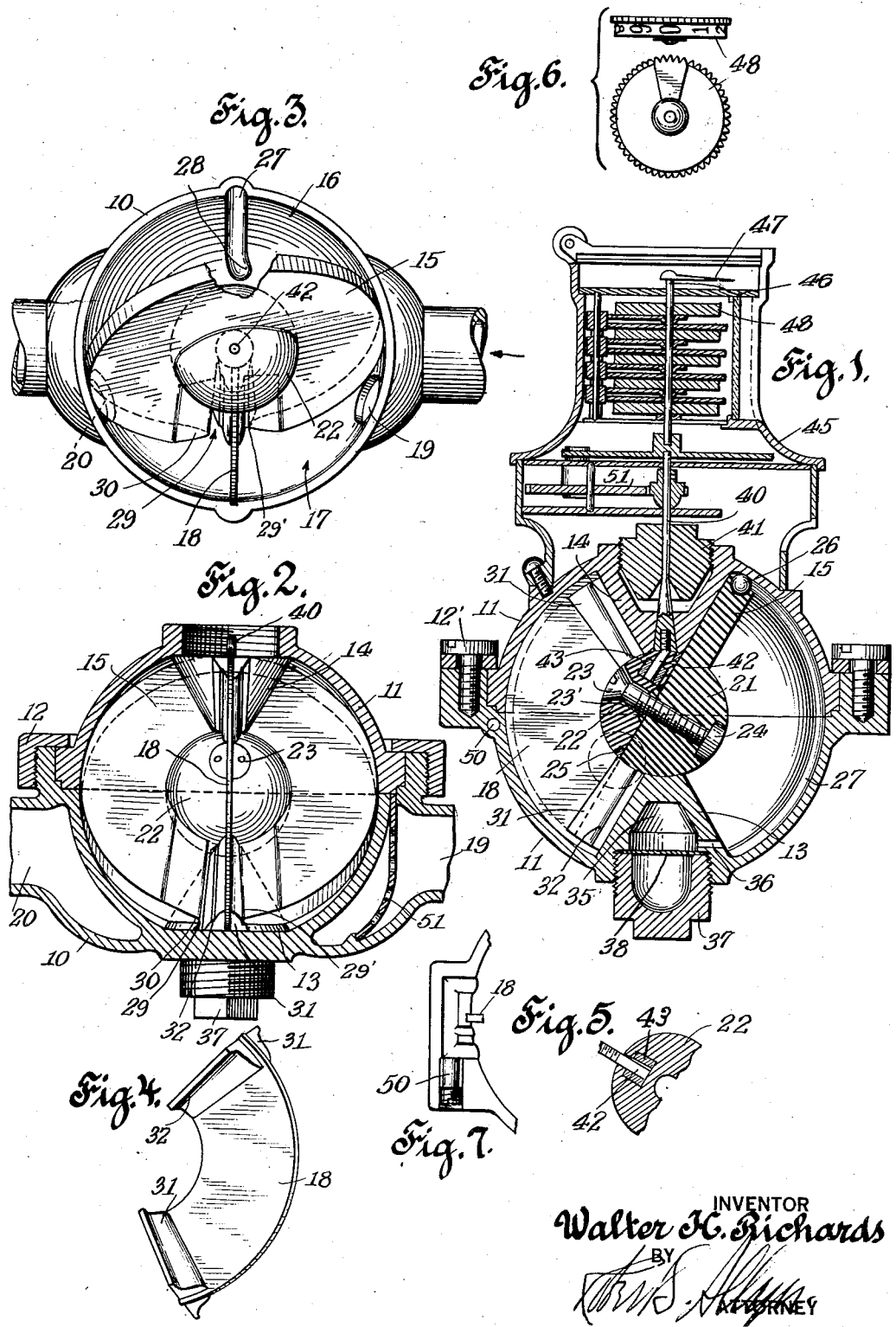
INVENTOR
Walter H. Richards
BY
ATTORNEY Patented Apr. 19, 1927.

1,625,428

UNITED STATES PATENT OFFICE.

WALTER H. RICHARDS, OF NEW LONDON, CONNECTICUT.

FLUID METER AND MOTOR.

Application filed August 31, 1925. Serial No. 53,549.

My invention relates to so-called disc-type mechanisms in which the flow of a fluid causes a nutatory motion of the disc which is connected to drive a counter or other mechanism. The invention is particularly applicable in structures such as shown in my former Patents Nos. 1,186,610, 1,200,521, and 1,285,388. While these constructions are referred to generally as meters, it is obvious that many of the details of construction are equally applicable to devices for generating or transmitting power for other purposes. For convenience herein and to avoid repetition I will refer to the present invention generally as applied to a motor, the specific purpose of which is the utilization of the movement or expansion of fluids or the power exerted thereby, which happens to be shown on the drawings as used for the purpose of driving a counter. It is understood, however, that I intend the claims shall be construed to cover broadly all structures of that character which are commercially designated as either meters or motors.

One object of my present invention is to maintain a continuous and even pressure on at least one-half of the disc. This is accomplished by suitably locating the entrance and exit ports so as to insure the unobstructed and continuous flow of the actuating fluid and prevent back-pressure at either the entrance or exit, and prevent leakage.

Another object is to avoid accident due to sudden and excessive pressures from any cause.

Another object is to avoid stoppage due to the entrance of solid material or objects.

Another object is to insure the exact centering of the moving mechanism, in the case.

In carrying the invention into effect, I provide a special construction and arrangement of a partition and slotted disc, and a special form of packing and stuffing box, details of which will be understood more fully hereinafter.

Fig. 1 is a vertical cross-sectional view of my invention as applied to a motor for driving a counter.

Fig. 2 is a vertical longitudinal sectional view of the motor part of the apparatus.

Fig. 3 is a plan view of the lower part of the motor casing and showing the disc.

Fig. 4 is a perspective view showing the partition and its enlargements.

Fig. 5 is a detail section of the hub.

Fig. 6 is a detail view of parts of the counter.

Fig. 7 is a fragmentary sectional view of the registry adjustment.

The casing in the form shown consists of the lower part or body 10 and the upper part 11 which may be secured in place in any suitable manner, for instance, by means of a screw-ring 12 or by bolts 12'. The casing is provided with the two cones 13 and 14 between and about which the disc 15 moves. The side 16 of the casing is unobstructed, (except by the moving disc). The other side 17 is divided in two parts by the partition 18 which extends from the inner wall of the casing to the cones 13 and 14. The fluid enters the casing through the inlet 19 and leaves through the outlet 20, the inlet and outlet being both arranged on what may be called the divided or partition side of the casing.

The disc member has a spherical hub mounted between the adjacent conical frustums, commonly termed cones, 13, 14. This hub consists of the parts 21 and 22. Part 21 may conveniently but not necessarily be made integral with the disc 15, and the part 22 is more or less loosely connected to the other part by means of a bolt 23 and nut 24. Part 22 turns on and is centered by the semi-spherical nut 23' which is screwed on to the bolt 23. All or part of the mechanism designated as 22, 23, 24 and 23' may be duplicated on the other side of the disk.

The opening through the part 22 is preferably somewhat larger than the bolt so as to permit a slight freedom of motion of the part 22 in respect to the disc. A packing ring 25 is also preferably provided between the part 22 and the disc 15. At one edge the disc is guided by a ball 26 adapted to travel in the groove 27 in the inner wall of the casing. The ends of this groove are preferably inclined or offset, as at 28, to aid in guiding the disc so as to insure the proper seating of the edge of the disc on the partition. The disc is slotted at 29 to receive the partition and to allow for the movement of the disc about the partition and passage of the fluid around the edge of the disc out through the exit port. This slot is quite wide and its edges are beveled and rounded as shown at 30.

The partition is provided with wedge-shaped enlargements 31 with which the edges of the slot of the disc cooperate from time to time as the disc nutates. These enlargements are also preferably provided with grooves 32 adapted to receive the edges 30 of the disc and insure a tight joint. The edges 30 of the slot 29 are radial and the slot and partition enlargements are carefully proportioned so as to permit proper freedom of movement of the disc and also properly control the passage of fluid. The slot should be of sufficient width to permit the contained fluid to pass over the edge of the disc slot at proper times, particularly if the disc has passed the inlet and outlet ports, otherwise the disc will be retarded by the fluid between the disc and the partition or the disc and cones. In the positions in which the disc is perpendicular to the plane of the partition, there would be a slight clearance at the edges of the slot so that the contained fluid would be free for an instant to pass from the inlet to the outlet port. To prevent this the guide groove 27 is offset at its upper and lower ends toward the inlet port 19 so as to cause one edge 29' of the slot to hug the partition enlargement and thus close the chamber and prevent the direct flow of fluid from one port to the other, and allow the passage of the fluid over the edge of the slot, at 29 and out of the exit port.

In the bottom of the casing I preferably provide a chamber 35 inside the cone bearing 13. The passage 36 permits small articles, such as particles of dirt, to escape through the opening 36 into the chamber 35 without damaging the disc. This chamber may be closed by a plug 37 which is adapted to be screwed in at the bottom and may be removed when necessary. I also prefer to provide an expansible or breakable diaphragm or disc 38 which may be clamped and held into place by the plug 37. This provides an expansible or breakable portion of the wall which is adapted to yield into the plug chamber in case of excessive expansion of the fluid in the casing. This affords a safety valve to prevent the breaking of the casing which would mean not only serious expense but delay and difficulty in replacement.

The shaft or spindle 40 from which power may be taken from the disc for any suitable purpose, is supported in a packing box or gland 41 in the top of the casing and in the cone bearing 14. It is connected somewhat loosely to the hub of the disc by means of an angular stud which extends into a conical recess in the socket 43 so as to insure the parts moving together but permitting relative freedom of movement and allow a slight tipping of the disc in case of obstruction. This stud 42 has its lower end extending at an angle so as to bring it substantially parallel to the plane of the disc. The lower end of the shaft 40 may also be tapered so as to insure a continuous seat in the cone bearing 14.

In the form illustrated in Fig. 1, a casing 45 is mounted on the top of the motor casing and provided with registering or counting mechanism driven by the disc and shaft above described. The counter mechanism and the spindle are designed so that one revolution of the spindle would correspond to the unit of measurement desired. The spindle is provided with an extension 46 and a pointer 47. A series of counters 48 are also provided according to the desired number of registrations. In case the shaft 40 is used to drive some other device a counter may be driven from gears 51 at one side.

In cases requiring extreme accuracy of registration, a regulator 50 may be provided for controlling the quantity of fluid passing around the partition. A screen 51 is preferably located outside and away from the disc chamber in an enlargement of the entrance spud. It should be understood, however, that the principle described in the invention is not limited to any particular construction or arrangement of screens or any particular method of regulation.

This construction, like most disc meters, measures the fluid in only that half of the casing which is on the opposite side from the partition. With the ordinary meter, fluid on both sides of the partition backs through the ports and screens against the pressure, the effort nearly equalizing the pressure on both sides of the disc and thus causing it to lift away from the bearing cones. According to my invention, on the other hand, a dead fluid is transferred through the slot in the disc from one side to the other, the disc being allowed to clear the partition slightly for this purpose but leaving the full pressure on one-half of the disc at all times so that there is substantially no tendency for the disc to lift away from the cones. When the disc stands at right angles to the partition, the entrance port is shut off from the side of the chamber away from the partition, the edge of the slot bearing against the enlargement of the partition on that side. The entering fluid pushes the disc around while the fluid on the other side is discharged without obstruction through the exit port without back pressure. This movement is, of course, similar when the disc is in the reverse position. The action will thus be seen to be both positive and continuous.

With an ordinary 5/8" disc meter, with a chamber capacity of 3.7 cu. in., it is geared to make about 300 revolutions per cubic foot of liquid, whereas if there was no leakage it would have to make 467 revolutions per minute for the same quantity. This shows accommodation for a leakage of approximately 34% required by and inherent in the construction itself. In my present invention, however, the only leakage to be provided for is that which exists around the disc and the ball, which I estimate is approximately 10%. The pressure on one-half of the disc is continuous because there is always less resistance on the other half. The running of such devices in oil, etc., has thus been rendered unnecessary.

Where the disc, with ordinary meter or motor of this character, nutates through an arc of about 40°, my apparatus will swing through an arc of approximately 120° so that with a given size or diameter of meter, my construction should deliver approximately three times the quantity of the ordinary meter. According to my invention the acute angle of the conical bearings reduces the tendency of the ball to leave the socket or become de-centered, since the line of movement lies closer to the center of the socket. Stability of my device is further increased by the enlargement of the partition adjacent the spherical part of the disc.

It has been found by experiment that with an ordinary ⅝" meter delivering 3 cu. ft. per minute, the resistance in the meter is approximately 25 pounds, largely due to the obstruction of the screens. According to my invention the screens are set so as to clear the case at every point. The opening through the disc chamber being much larger for a given size meter, friction loss is further reduced and capacity increased.

By making the apparatus with a single case it is more compact and effects a great saving in cost.

As is well known, ordinary disc meters often become clogged and cease to register but they have such great clearance that water passes through and the fact that the meter has ceased to register may be unnoticed for a considerable period of time. In the meanwhile the consumer gets his water without charge. My construction being positive in its action, any obstruction would materially reduce the flow to such an extent that it would be noticed and reported at once.

As is well known, all motors or meters having a reciprocating motion, are subject to the disadvantage of losing all momentum at the end of each stroke and in all current or rotary type of meters or motors, a part of the fluid passes through the mechanism without positive effect, in fact in case of stoppage, passes through without moving the mechanism. In my invention the motion is rotary and at the same time positive and continuous.

I claim:

1. A fluid motor comprising a casing having inlet and outlet ports on one side of the center-line, conical bearing members, a partition between the inlet and outlet ports, and a nutating disc mounted between said bearings and slotted to co-act with said partition, said partition extending to said bearing members and having wedge-shaped enlargements adjacent said bearings serving as seats for the edges of said slot.

2. A motor comprising a casing having oppositely-disposed conical bearings, a partition at one side of the center line and extending to said bearings and having wedge-shaped enlargements adjacent thereto, a nutating disc mounted between said bearings and slotted to co-act with said partition and its enlargements and means for tilting said disc as the edges of its slot engage said enlargements.

3. A motor comprising a casing having oppositely-disposed conical bearings, a partition at one side of the center line and extending to said bearings and having wedge-shaped enlargements adjacent thereto, a nutating disc mounted between said bearings having a projection and slotted to co-act with said partition and its enlargements, and said casing having a groove for guiding the projection on said disc, the ends of said groove being offset to deflect said projection and rotate said disc about a vertical axis.

4. A motor comprising a casing having conical bearings, a disc having a spherical hub mounted between said bearings, a shaft extending through one of said bearings, and means of connection between said hub and said shaft having limited freedom of movement and comprising a tapered socket in said hub and an angular pin carried by said shaft and movable in said socket.

5. A motor comprising a casing having oppositely-disposed conical bearings, a disc mounted to nutate in said bearings, one of said bearings having a recess with a passage leading inside of said casing, a plug for closing said recess, and a yielding member held in said recess by said plug and forming a wall of said recess.

6. A motor comprising a casing having bearing seats, a partition in said casing between said bearing seats having enlargements at its opposite ends provided with grooves, and a disc mounted between said bearing seats and provided with a slot having beveled edges adapted to engage in said grooves, the edges of said slot extending radially of said disc.

WALTER H. RICHARDS.